J. S. PECK.
SYSTEM OF ELECTRICAL DISTRIBUTION.
APPLICATION FILED APR. 12, 1909.
1,015,974.
Patented Jan. 30, 1912.
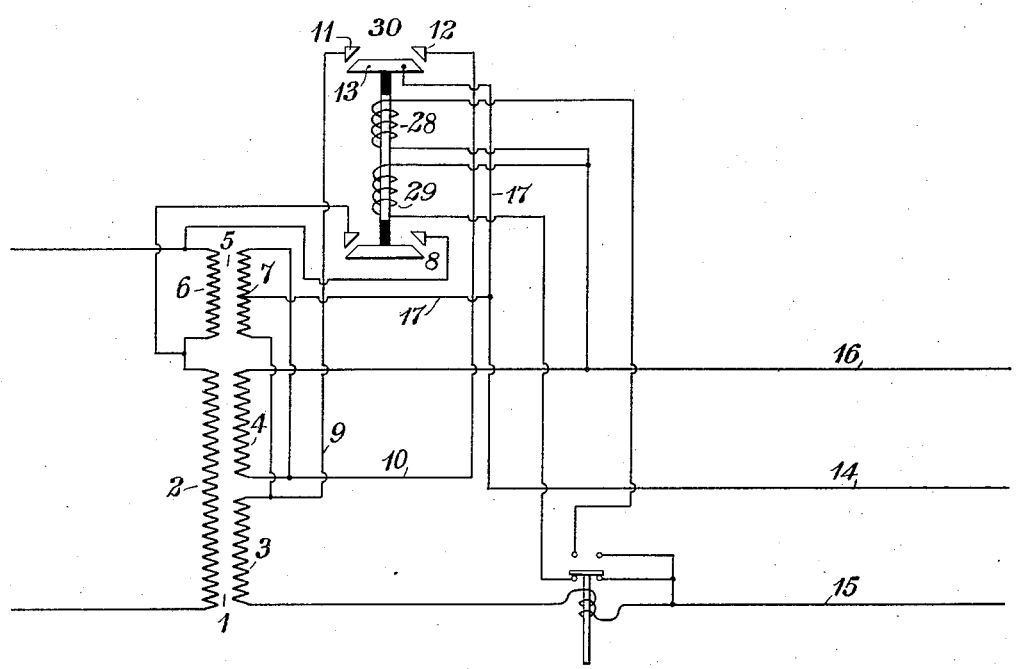
WITNESSES:
C. L. Belcher
B. B. Hines
INVENTOR
John S. Peck
BY
ATTORNEY

UNITED STATES PATENT OFFICE.

JOHN SEDGWICK PECK, OF MANCHESTER, ENGLAND, ASSIGNOR TO WESTINGHOUSE ELECTRIC AND MANUFACTURING COMPANY, A CORPORATION OF PENNSYLVANIA.

SYSTEM OF ELECTRICAL DISTRIBUTION.

1,015,974.      Specification of Letters Patent.      Patented Jan. 30, 1912.

Application filed April 12, 1909. Serial No. 489,253.

*To all whom it may concern:*

Be it known that I, JOHN SEDGWICK PECK, a citizen of the United States, and a resident of Manchester, England, have invented a new and useful Improvement in Systems of Electrical Distribution, of which the following is a specification.

My invention relates to systems of electrical distribution in which alternating current transformers are employed and it has particular reference to systems of this kind in which two transformers (main and auxiliary) are interposed between the supply and distribution circuits, the auxiliary transformer windings being arranged to be short-circuited only when there is a considerable load upon the distribution circuit, for the purpose of securing economical operation when the distribution circuit is lightly loaded.

When an arrangement of the above character is applied to a three-wire system, it has hitherto been customary to connect the middle wire of the distribution system to the middle point of the corresponding winding of the main transformer. The auxiliary transformer winding is divided into two equal parts and these are connected in series with the main winding, the extremities of the auxiliary windings being then connected to the outer wires of the distribution circuit. The auxiliary windings are arranged to be short-circuited except when the system is lightly loaded. With this system of connection, two switches are evidently necessary to close the short-circuiting connection on one side of the transformer, while at least one further switch is needed to short-circuit the auxiliary winding on the other side of the transformer.

The present invention has for its object to provide an improved arrangement of transformer connections in a system of this kind in which only one such switch need be employed in connection with the windings which supply the three-wire distribution circuit, with a corresponding gain in simplicity and reduction in cost of the apparatus.

I accomplish the desired objects, according to the present invention, as follows: The secondary winding of the main transformer is divided into two equal portions which are connected across the outer wires of the distribution system, with the secondary winding of the auxiliary transformer interposed in series between them. The middle point of the auxiliary winding is connected to the middle wire of the three-wire system, and is also connected to the bridge-piece of a switch which coöperates with two contacts, connected, respectively, to the terminals of the auxiliary winding.

The single figure of the accompanying drawing is a diagrammatic view of a distribution system embodying my invention.

The main transformer 1 has a primary winding 2 and a secondary winding, the latter being divided into two equal parts 3 and 4. The auxiliary transformer 5 has a primary winding 6 and a secondary winding 7, the terminals of the latter being connected to the terminals 9 and 10 of the main transformer windings 3 and 4, respectively. The terminals 9 and 10 are also connected to the contact terminals 11 and 12 of a switch 30, the bridge piece 13 of which is connected, by a conductor 17, to the middle point of the winding 7 of the auxiliary transformer. The primary winding 6 of the auxiliary transformer is provided with a short-circuiting switch 8, while the outer conductors 15 and 16 of the three-wire system are connected to the terminals of the secondary windings 3 and 4 of the main transformer, the middle wire 14 of the system being connected to the bridge piece 13. With this arrangement, it will be readily seen that, when the bridge-piece 13 is moved into engagement with the contacts 11 and 12, the winding 7 of the auxiliary transformer is short-circuited and the middle wire 14 of the system is connected, through the bridge piece 13, to the middle point of the secondary winding of the main transformer. As indicated in the drawing, the switch 8 for short-circuiting the primary winding 6 of the auxiliary transformer is arranged to be closed at the same time as the bridge piece 13. The switch 30 may be arranged to be closed by means of a coil 28 and opened by means of a coil 29, in accordance with the load on the three-wire system, or it may be manually controlled, and a similar set of connections may, of course, be used on the primary side of the main and auxiliary transformers, if desired.

I claim as my invention:

1. In a three-wire system of electrical distribution for alternating currents, the combination with a main transformer and an auxiliary transformer having their secondary windings normally connected in series to the main circuit conductors, and the middle point of the secondary winding of the auxiliary transformer being connected to the neutral or balancing conductor of the system of a switch for short-circuiting the said secondary winding of the auxiliary transformer, the movable contact member of which is connected to said middle point and neutral conductor.

2. In a three-wire system of electrical distribution for alternating currents, the combination with a main transformer having a two-part winding the adjacent terminals of which are provided with contact members and the other terminals of which are connected to the main distributing conductors, and an auxiliary transformer having a winding the ends of which are connected to said adjacent terminals and the middle point of which is connected to a bridging device for said contact terminals and to the balancing conductor of the system.

3. In a three-wire system of electrical distribution, the combination with a main transformer having a two-part secondary winding the adjacent terminals of which are provided with contact members and the other terminals of which are connected to the main distributing conductors, and an auxiliary transformer having the terminals of its secondary winding connected to said adjacent terminals of the main transformer and its middle point connected to the balancing conductor of the main circuit, of means for simultaneously short-circuiting both the primary and the secondary windings of the auxiliary transformer.

4. In a three-wire system of electrical distribution for alternating currents, a main transformer and an auxiliary transformer having their secondary windings normally connected in series to the distributing circuit, and the middle point of the secondary winding of said auxiliary transformer being connected to the neutral or balancing conductor of the system of switches for short-circuiting the windings of the auxiliary transformer, the movable contact member of one of said switches being connected to said middle point and neutral conductor, and means for simultaneously actuating said switches.

5. In a three-wire system of electrical distribution for alternating currents, the combination with a main transformer and an auxiliary transformer having their corresponding windings normally connected together in series relation, and the middle point of the secondary winding of the auxiliary transformer being connected to the neutral or balancing conductor of the system, of means for simultaneously short-circuiting both windings of the auxiliary transformer, one member of said means being permanently connected to said middle point and neutral conductor.

In testimony whereof, I have hereunto subscribed my name this 24th day of March, 1909.

JOHN SEDGWICK PECK.

Witnesses:
J. MORRIS,
G. W. PINNER.

---

Copies of this patent may be obtained for five cents each, by addressing the "Commissioner of Patents, Washington, D. C."